(12) United States Patent  
Ieda et al.

(10) Patent No.: US 8,630,772 B2  
(45) Date of Patent: Jan. 14, 2014

(54) OCCUPANT PROTECTION SYSTEM FOR VEHICLE

(75) Inventors: Kiyokazu Ieda, Kariya (JP); Yuichi Murakami, Chiryu (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 298 days.

(21) Appl. No.: 12/850,809

(22) Filed: Aug. 5, 2010

(65) Prior Publication Data

US 2011/0035116 A1    Feb. 10, 2011

(30) Foreign Application Priority Data

Aug. 6, 2009  (JP) ................................. 2009-183702

(51) Int. Cl.  
*B60R 22/00*  (2006.01)

(52) U.S. Cl.  
USPC .............................. 701/45; 701/301; 280/735

(58) Field of Classification Search  
USPC .......................... 701/45, 301, 36, 93; 280/735  
See application file for complete search history.

(56) References Cited

U.S. PATENT DOCUMENTS

| | | | | |
|---|---|---|---|---|
| 7,072,753 | B2 * | 7/2006 | Eberle et al. | 701/45 |
| 7,359,782 | B2 * | 4/2008 | Breed | 701/45 |
| 7,441,624 | B2 | 10/2008 | Tobata | |
| 7,480,562 | B2 * | 1/2009 | Kustosch | 701/93 |
| 7,997,613 | B2 | 8/2011 | Kobayashi et al. | |
| 2005/0087381 | A1 | 4/2005 | Tobata | |
| 2005/0278098 | A1* | 12/2005 | Breed | 701/45 |
| 2007/0152804 | A1* | 7/2007 | Breed et al. | 340/435 |
| 2007/0164896 | A1* | 7/2007 | Suzuki et al. | 342/70 |
| 2007/0185635 | A1 | 8/2007 | Mattes et al. | |
| 2008/0147253 | A1* | 6/2008 | Breed | 701/3 |
| 2008/0215231 | A1* | 9/2008 | Breed | 701/117 |
| 2008/0238056 | A1 | 10/2008 | Kobayashi et al. | |
| 2010/0121526 | A1* | 5/2010 | Pham | 701/36 |

(Continued)

FOREIGN PATENT DOCUMENTS

| | | |
|---|---|---|
| DE | 103 19 444 A1 | 11/2004 |
| DE | 10 2006 002 746 A1 | 7/2007 |

(Continued)

OTHER PUBLICATIONS

European Search Report issued in European Application No. 10171240.4-1523 dated Nov. 30, 2010.

(Continued)

*Primary Examiner* — Khoi Tran  
*Assistant Examiner* — Shardul Patel  
(74) *Attorney, Agent, or Firm* — Sughrue Mion, PLLC (57) ABSTRACT

An occupant protection system for vehicle, includes an own-vehicle information acquisition unit acquiring an own-vehicle information including a route information on a course of an own vehicle to a destination, an other-vehicle information acquisition unit acquiring other-vehicle information that is received through vehicle-to-vehicle communication and that includes position information of another vehicle, a crash condition calculation unit calculating a crash condition between the own vehicle and said another vehicle on the basis of the own-vehicle information and other-vehicle information, and an operation preparation unit preparing a system which corresponds to a crash damage decreasing system decreasing a level of a crash damage of an occupant of the own vehicle, and which is adapted to decrease the level of the crash damage that corresponds to the crash condition calculated by the crash condition calculation unit to operate.

15 Claims, 7 Drawing Sheets

(56) References Cited

U.S. PATENT DOCUMENTS

| | | | |
|---|---|---|---|
| 2010/0169009 A1* | 7/2010 | Breed et al. | 701/208 |
| 2010/0280751 A1* | 11/2010 | Breed | 701/207 |
| 2012/0209505 A1* | 8/2012 | Breed et al. | 701/409 |

FOREIGN PATENT DOCUMENTS

| | | |
|---|---|---|
| DE | 10 2008 010 667 A1 | 8/2008 |
| EP | 1 785 744 A1 | 5/2007 |
| JP | 2005-126006 | 5/2005 |
| JP | 2007-500650 A | 1/2007 |
| JP | 2007-314015 A | 12/2007 |
| JP | 2008-247319 | 10/2008 |
| JP | 2009-74803 A | 4/2009 |
| JP | 2009-157508 A | 7/2009 |

OTHER PUBLICATIONS

Office Action, dated May 23, 2013, issued in corresponding Japanese Patent Application Publication No. 2009-183702.

Office Action, dated Mar. 14, 2013, issued in corresponding Japanese Patent Application Publication No. 2009-183702.

* cited by examiner

OCCUPANT PROTECTION SYSTEM FOR VEHICLE

CROSS REFERENCE TO RELATED APPLICATIONS

This application is based on and claims priority under 35 U.S.C. §119 to Japanese Patent Application 2009-183702, filed on Aug. 6, 2009, the entire content of which is incorporated herein by reference.

TECHNICAL FIELD

This disclosure relates to an occupant protection system for a vehicle for protecting the occupant of the vehicle at a time of a crash.

BACKGROUND DISCUSSION

A known occupant protection system for a vehicle for protecting a vehicle occupant by, for example, causing an airbag to inflate immediately after a crash or a collision occurs, is suggested and practically in use. Pre-crash systems are also suggested and some of them are practically in use. In case the pre-crash system determines, before the crash, that the crash is unavoidable on the basis of a state of vehicle surroundings or vehicle behavior, the system causes a protection device to operate at an early timing. For example, a pre-crash system (an occupant protection system for a vehicle) disclosed in JP2007-500650A includes an adaptive seat that is controlled on the basis of a sensor signal. According to this pre-crash system, a recess is provided on a seat cushion, and a front portion of the seat is raised or a tensioning force of a seatbelt is increased by a belt tensioner at the time of a crash to prevent a submarine phenomenon, where the occupant slides forward so as to pass through a space between the waist seatbelt and the seat cushion at the time of the crash. In addition, a seat side support member is raised up at the time of the crash to prevent the occupant from being laterally slid. Further, a device including therein a cushion is deployed, in a manner of a collar, out of a headrest to prevent that the head of the occupant is moved by an impact of the crash.

A pre-crash system needs to detect any crash as early and accurately as possible so as to cause an actuator to actuate or move a seat, a seatbelt or the like. Therefore, for example, installing plural millimeter wave sensors is suggested to promptly determine a possibility of a frontal crash and a lateral crash. The system disclosed in JP2009-74803 includes one radar which detects an object in front of the own vehicle, and two radars which detect an object diagonally left and right forward of the own vehicle.

The actuator for moving or actuating the seat, the seatbelt or the like needs a period of time before it starts to actuate. The seat, the seatbelt or the like that are moved by the actuator also needs a period of time before it starts a mechanical operation. These periods of time are preferably as short as possible. One conceivable way to make the period shorter is to predict, instead of detect, the crash and to activate the pre-crash system. An occupant protection system disclosed in JP2007-314015 is able to modify a seated posture of the occupant depending on a type of crash upon detection of occurrence of the crash. For example, the vehicle is provided with plural cameras for a left lateral crash, a right lateral crash, and a rear-end crash. Image signals sent from the cameras are analyzed, and the occurrence of the crash is predicted on the basis of analysis results. Although a specific way of prediction is not described in the JP2007-314015, the occurrence of the crash is predicted by calculating a distance between the own vehicle and another vehicle, and the type of the crash. This calculation is performed on the basis of ever-changing information on position and speed of the another vehicle that is acquired from the another vehicle via a vehicle-to-vehicle communication.

When the crash is predicted and the pre-crash system is activated but no crash actually occurs, the seat, the seatbelt or the like is needlessly operated. If the seatbelt is repeatedly tightened and loosened, or the seat or the seatback is repositioned while driving, the occupant may perceive this as annoying. In a similar way, a warning may be perceived as annoying unless it is issued based on an accurate crash prediction and at an appropriate timing. For example, if the warning is issued too early, that is, if the warning is repeatedly issued even in case that the driver can reasonably avoid the crash by a normal driving maneuver, this may not only frustrate the driver but also decrease the driver's trust in the warning for a future occasion. Consequently, it is ideal that the crash is predicted with a high accuracy at an appropriate timing. It is also ideal that the pre-crash system is structured and controlled so as to provide a good response to the predicted crash. Improvement of accuracy of the crash prediction or response speed of the system, however, involves complexity in a mechanical structure of an actuator or a driven member, which may result in increase of costs.

A need thus exists for an occupant protection system for a vehicle, which is not susceptible to the drawback mentioned above.

SUMMARY

According to an aspect of this disclosure, an occupant protection system for vehicle includes an own-vehicle information acquisition unit acquiring an own-vehicle information that includes a route information on a course of an own vehicle to a destination, an other-vehicle information acquisition unit acquiring other-vehicle information that is received through vehicle-to-vehicle communication between the own vehicle and another vehicle, and that includes position information of the another vehicle, a crash condition calculation unit calculating a crash condition between the own vehicle and the another vehicle on the basis of the own-vehicle information and the other-vehicle information, and an operation preparation unit preparing a system which corresponds to a crash damage decreasing system decreasing a level of a crash damage of an occupant of the own vehicle and which is adapted to decrease the level of the crash damage that corresponds to the crash condition calculated by the crash condition calculation unit to operate.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

An embodiment of a structure of this disclosure will be explained with reference to FIGS. 1 to 10. An occupant protection system for a vehicle according to the embodiment is a comprehensive safety system where a crash safety system (a passive safety system) for decreasing damage from a crash or the like, and a preventive safety system (an active safety system) for decreasing the damage by predicting a possible crash, are integrated. In the embodiment, the comprehensive safety system that comprehensively covers, that is, takes appropriate measures, in a period from pre-crash to post-crash as explained above is referred to as the pre-crash safety system. An SRS (a supplemental restraint system) airbag is one example of the passive safety system. The active safety system includes a seatbelt tensioner that retracts the seatbelt instantly at the time of the crash so as to increase the belt tension and an active seat (a pre-crash seat) that changes a position of the seat instantly at the time of the crash.

Figure 1:
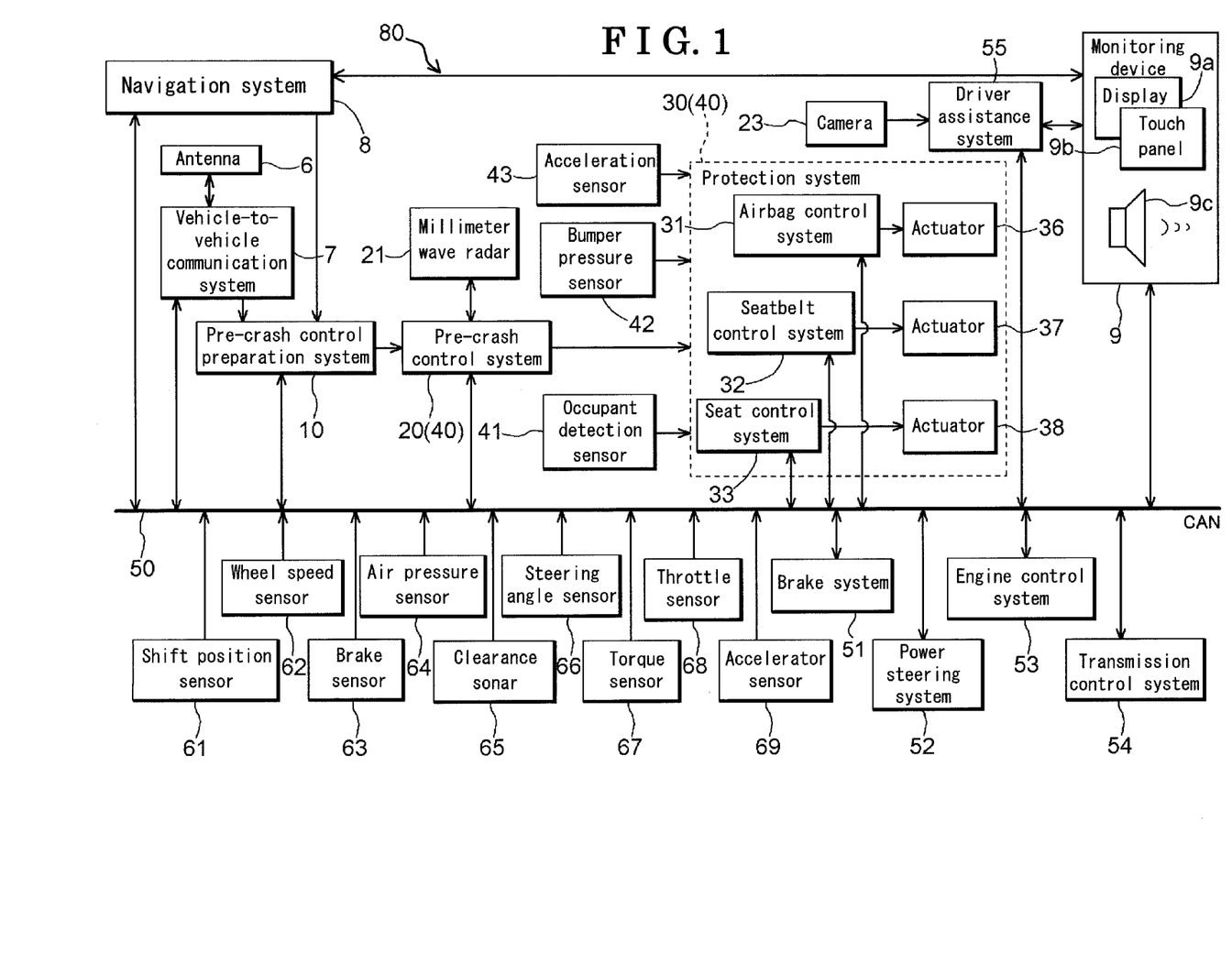
FIG. 1 is a configuration diagram of an example of a system configuration of an own vehicle.

As shown in FIG. 1, the occupant protection system for the vehicle (hereinafter referred to as an occupant protection system) according to the embodiment includes a pre-crash control preparation system 10, a pre-crash control system 20 and a protection system 30. The pre-crash control system 20 corresponds to the preventive safety system (active safety system), the protection system 30 corresponds to the crash safety system (passive safety system), and the occupant protection system corresponds to the comprehensive safety system (pre-crash safety system). The pre-crash control system 20 and the protection system 30 correspond to a crash damage decreasing system 40. As explained above, the crash damage decreasing system 40 comprehensively takes appropriate measures in the period from pre-crash to post-crash to decrease a level of crash damage that an occupant of an own vehicle 80 may suffer in the crash where the own vehicle 80 is involved. The occupant protection system also includes, in addition to the pre-crash control system 20 and the protection system 30 both of which work as the crash damage decreasing system 40, the pre-crash control preparation system 10. The pre-crash control preparation system 10 prepares functions of the crash damage decreasing system 40 to be performed.

Figure 2:
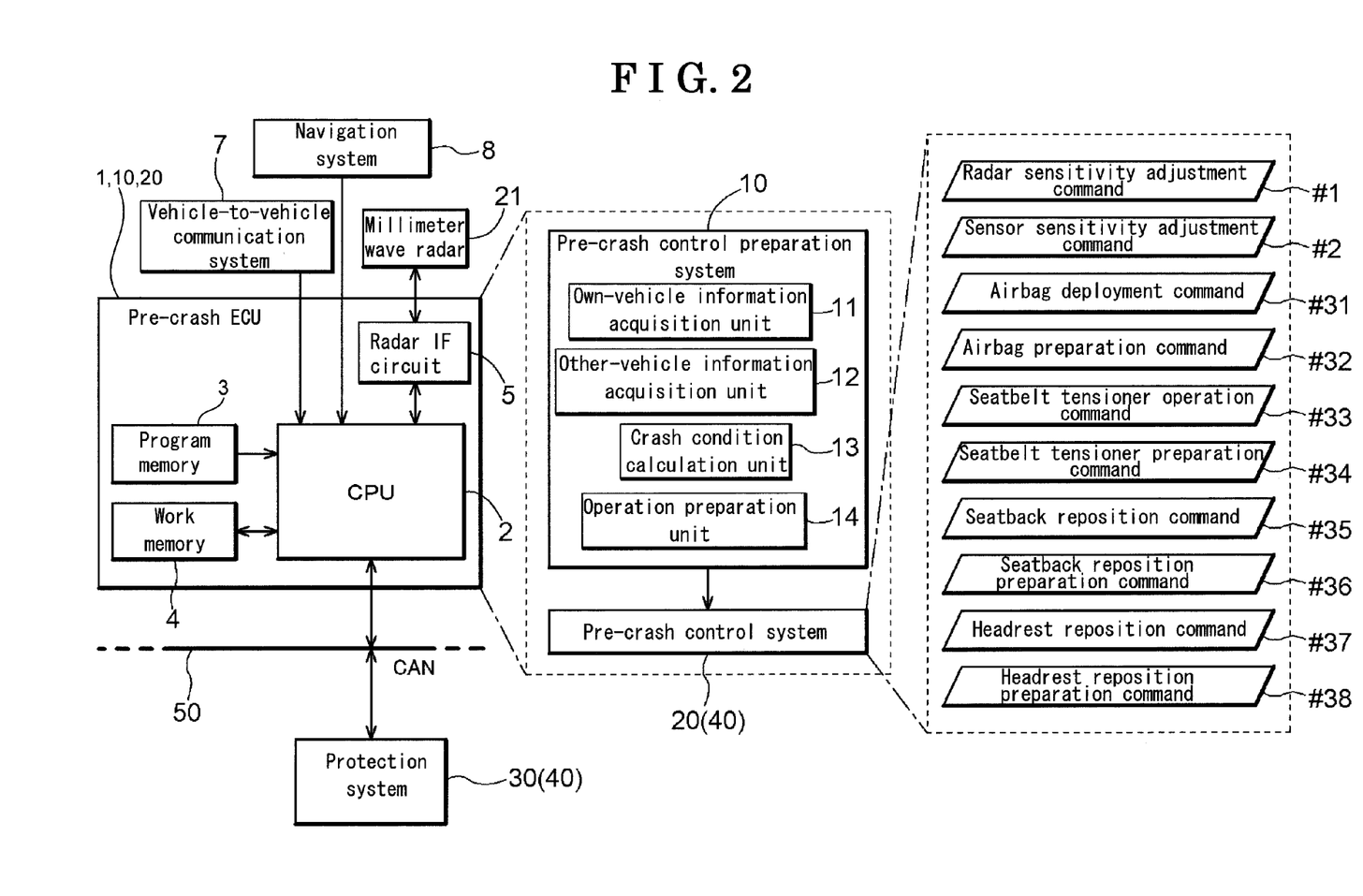
FIG. 2 is a configuration diagram indicating an example of a system configuration of an occupant protection system.

As shown in FIG. 2, the pre-crash control preparation system 10 includes function units; an own-vehicle information acquisition unit 11, an other-vehicle information acquisition unit 12, a crash condition calculation unit 13 and an operation preparation unit 14. The own-vehicle information acquisition unit 11 is the function unit that acquires own-vehicle information which includes information about a course that the own vehicle 80 takes to get to its destination (a route information R). Specifically, the own-vehicle information acquisition unit 11 acquires navigation information that includes the route information R via a navigation system 8 installed on the own vehicle 80. The other-vehicle information acquisition unit 12 is the function unit that acquires other-vehicle information which is received through vehicle-to-vehicle communication between the own vehicle 80 and another vehicle and includes position information of the another vehicle. The another vehicle acquires the position information via a navigation system, a GPS (global positioning system) device or other systems which are installed on the another vehicle. The other-vehicle information acquisition unit 12 acquires the other-vehicle information via an antenna 6 installed on the own vehicle 80 or through a vehicle-to-vehicle communication system 7.

The crash condition calculation unit 13 is the function unit that calculates, on the basis of the own-vehicle information and the other-vehicle information, a condition of a possible crash between the own vehicle 80 and the another vehicle (a crash condition). The crash condition may include a type of the crash relative to the own vehicle 80 such as a frontal crash, a side crash and a rear-end crash. The crash condition may also include a possibility for the crash condition to be established (a possibility for the crash to occur). Further, the crash condition may include a vehicle attitude and vehicle speed of the own vehicle 80 at the time of the crash. The vehicle attitude refers to whether the vehicle is travelling forward or backward, turning right or left, cornering, stopped or in other states. On the basis of the established crash condition, the operation preparation unit 14 operates the pre-crash control system 20 to prepare an operation of an appropriate system existing in the systems that are included in the crash damage decreasing system 40. The appropriate system refers to the system that is able to decrease the level of the crash damage that the occupant of the own vehicle 80 may suffer under the calculated crash condition. In other words, the crash damage decreasing system 40 has various functions, that is, various systems, for decreasing the level of the crash damage that the occupant of the own vehicle 80 may suffer in the event of the crash and the operation preparation unit 14 prepares the function or functions related to the currently calculated crash condition, that is, the function or functions that is adapted to decrease the level of the crash damage that corresponds to the currently calculated crash condition.

An overall system configuration of the own vehicle 80 will be explained below. After that, the system configuration of the occupant protection system and examples of its control will be explained in details. As shown in FIG. 1, the occupant protection system 10, 20, 30, 40 is connected to various systems and sensors via an in-vehicle network, CAN (controller area network) 50. The occupant protection system 10, 20, 30, 40 performs an occupant protection function in cooperation with these various systems and sensors.

The vehicle-to-vehicle communication system 7 controls the vehicle-to-vehicle communication in which vehicles directly exchange information with each other. That is, the vehicle-to-vehicle communication system 7 enables a direct communication between the own vehicle 80 and the other vehicles for information exchange. The vehicle-to-vehicle communication system 7 may further include a function to perform a vehicle-to-infrastructure-to-vehicle communication via roadside repeater equipment (roadside device). The vehicle-to-vehicle communication uses radio waves of, for example, 700 MHz band (around 715 MHz to 725 MHz), and the antenna 6 that supports this frequency band is installed in the vehicle. Communication is available with other vehicles within a range of approximately 270 to 300 meters in an area where few buildings exist a good view is ensured, and approximately 90 meters in an urban area where many buildings that may block the radio waves exist. The vehicle-to-vehicle communication or a vehicle-to-infrastructure-to-vehicle communications may be performed by using radio waves of 5.8 GHz band. This band of radio wave is also used for a road-to-vehicle communication that is made via the roadside repeater equipment. The vehicle-to-vehicle communication system 7 provides the information exchange between the own vehicle 80 and the another vehicle in terms of positions, vehicle speed, directions of travel, and vehicle information (identification information, i.e. ID information, dimensions, category and model year of the vehicle). In case the vehicle is equipped with the navigation system, the vehicle-to-vehicle communication system 7 may exchange the information on the destinations or the courses.

The navigation system 8 assists a driver by providing directions or the route to the destination. The navigation system 8 determines current location of the own vehicle 80 by using a GPS device, an autonomous navigation device such as a gyroscope, or other device, and compares the determined current location with a map stored in the navigation system 8 in order to assist the driver with driving. A monitoring device 9 of this embodiment includes a display 9a and a touch panel 9b that function as a GUI (graphic user interface) of the navigation system 8. As explained above, the navigation system 8 functions in cooperation with the pre-crash control preparation system 10.

A brake system 51 refers to an electric brake system that provides brake assist or the like. The brake assist detects a brake-pedal depression amount by using a brake sensor 63 and applies braking power to the vehicle via an actuator to increase a braking effort. Also, the brake system 51 may refer to an ABS (anti lock braking system) for preventing locking up of tires, an antiskid brake system (ESC: electronic stability control) or a BBW (brake-by-wire) system. The brake system 51 may function as the crash damage decreasing system 40. For example, the brake system 51 may provide the brake assist by increasing hydraulic pressure of a brake mechanism regardless of the brake-pedal depression amount, or may provide emergency braking that is automatically applied in an emergency.

A power steering system 52 refers to, for example, an electric power steering (EPS) system that detects an amount of steering operation by using a steering angle sensor 66 or a torque sensor 67, and applies an assist torque via an actuator. In case the occupant protection system includes a driver assistance system 55 that features a parking assist function, automatic steering may be performed by causing an actuator to maneuver a steering wheel.

An engine control system 53 controls operation of the engine by controlling an amount of fuel injection or ignition timing in cooperation with a throttle sensor 68 or an accelerator sensor 69. A transmission control system 54 controls optimum gear shifting and gear selection in cooperation with a shift position sensor 61, a wheel speed sensor 62, the engine control system 53 or other sensors or systems. The driver assistance system 55, a safety control system and other systems are also included in the system configuration of the own vehicle 80. The driver assistance system 55 includes a monitoring system and a parking assist system both of which operate in cooperation with a camera 23. The safety control system operates in cooperation with an air pressure sensor 64 and a clearance sonar 65.

The sensors 61 to 69 shown in FIG. 1 work in combination with plural systems accordingly, rather than with one particular system. The sensors 61 to 69 may be connected to the CAN 50 directly or via the systems 51 to 55. For example, the wheel speed sensor 62 for detecting vehicle wheel rotation or rotational speed per unit time may be provided in the brake system 51. In case that the brake system 51 is the ABS or the antiskid brake system, the brake system 51 may perform a prompt control by receiving a detection result from the wheel speed sensor 62 directly but not via the CAN 50. Thus, the systems and sensors, and their connection configuration shown in FIG. 1 are intended to be exemplary only and not limiting.

The protection system 30 includes an airbag control system 31 for controlling the SRS, a seatbelt control system 32 for controlling the seatbelt tensioner and a seat control system 33 for controlling the active seat. The seat control system 33 functions as an active seat system with which the occupant adjusts the position of the seat in non-crash situations, and functions as a pre-crash seat system when it is required to serve as the protection system 30. The airbag control system 31 controls and actuates an actuator 36 for deploying the airbag. The seatbelt control system 32 controls and actuates an actuator 37 for retracting the seatbelt. The seat control system 33c controls and actuates an actuator 38 for moving the seat. Each of these systems may control and actuate the plural actuators. The above is intended to be exemplary only and the protection system 30 may be provided with other mechanisms.

The airbag control system 31 is not limited to controlling the SRS airbag for a driver's seat or a front passenger's seat, and may control a side airbag, a curtain airbag, a knee airbag, a rear-seat center airbag or the like. At the time of the crash, the side airbag deploys from a door of the vehicle to prevent the occupant from crashing into the door, and the curtain airbag deploys from a ceiling along the door to prevent the occupant from crashing into a window or a pillar. The knee airbag deploys from the steering wheel or from beneath a glove box to decrease an impact to the occupant's knees. The rear-seat center airbag deploys from the ceiling downward to a space between the occupants seated on the rear seat to prevent the occupants from crashing into each other.

Figure 3A:
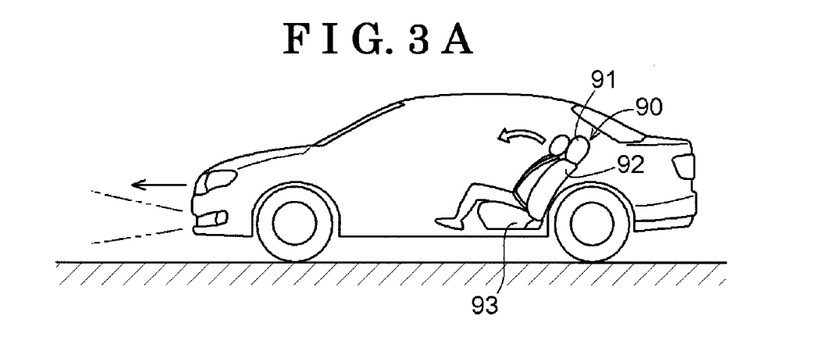
FIG. 3 illustrates an example of a pre-crash seatback.
Figure 3B:
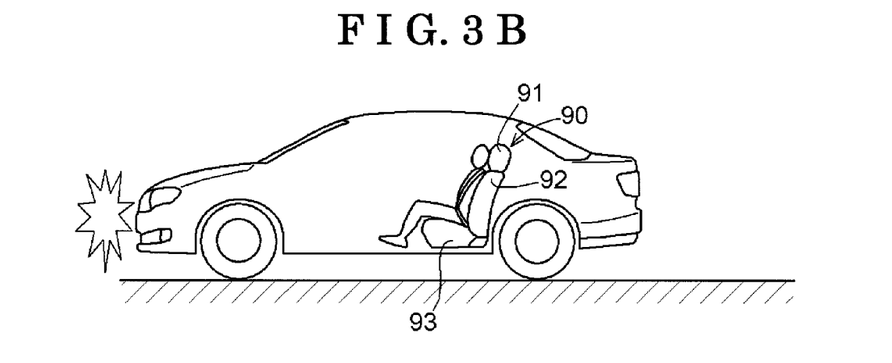

FIG. 3 shows an example of the seat control system 33 (the pre-crash seat system). In this example, the seat control system 33 causes a seatback 92 to return to an appropriate position, if the seatback 92 is reclined at a larger angle than a predetermined angle, in order to maximize occupant protection features provided by the seatbelt. Here, this is referred to as a pre-crash seatback. By returning the seatback to the appropriate position, a tightening force of the seatbelt against the occupant is enhanced and the impact of the crash applied to the occupant is decreased. When the pre-crash seat system functions as the protection system 30, the seatback 92 is required to be repositioned at a higher speed than a typical active seat, for example, pivoted at 10 degrees per second.

Figure 4A:
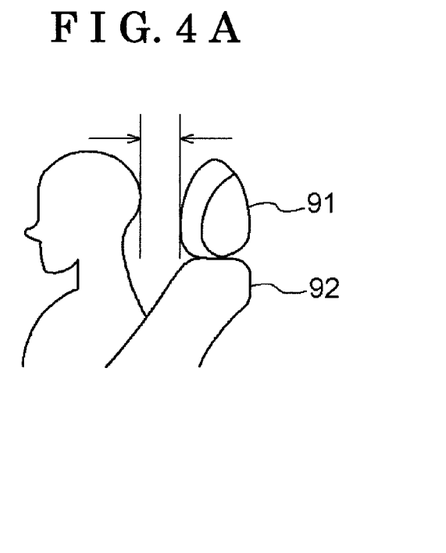
FIG. 4 illustrates an example of a pre-crash headrest.
Figure 4B:
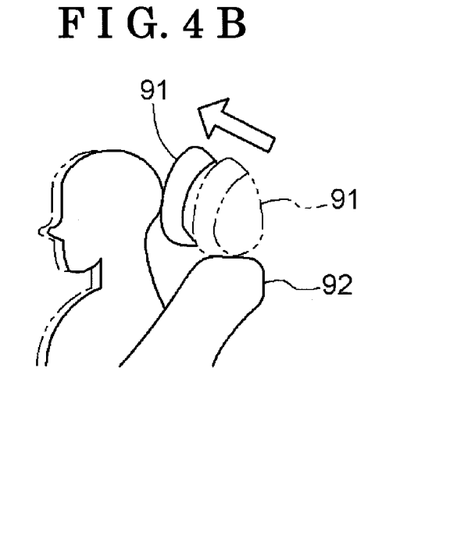

FIG. 4 shows another example of the seat control system 33 (the pre-crash seat system), where a headrest 91 is moved immediately before the crash, specifically when the own vehicle 80 is rear-ended, to decrease a distance between a head of the occupant and the headrest 91, thereby decreasing the impact applied to the head and the neck of the occupant, and alleviating whiplash injury. Here, this is referred to as a pre-crash headrest. A sensor built in the headrest 91 may detect a position of the head, and the headrest 91 may be appropriately repositioned. A front portion of a seat cushion 93 may be raised at the time of the crash to prevent a submarine phenomenon, where the occupant's body sinks and slides under the seatbelt due to an inertia force (a pre-crash seat cushion). The front portion of the seat cushion 93 may be raised by deploying an airbag installed inside the seat cushion 93 (a seat cushion airbag). An entire seat 90 may be slid forward or rearward relative to the vehicle so as to be moved to the most appropriate position that maximizes effects of the seatbelt or the airbag (a pre-crash seat).

However, it does not make sense to cause the pre-crash seat to operate when no occupant is seated on the seat 90. In addition, the most appropriate position of the seat 90 depends on a physical constitution of the occupant seated thereon. Therefore, the seat control system 33 may use a detection result of an occupant detection sensor 41. A known occupant detection sensor uses, for example, a torsion-bar or a piezo-electric sensor. The seatbelt control system 32 and the airbag control system 31 also perform the control on the basis of the detection results of the occupant detection sensor 41. Because it is not ideal to deploy the airbag when a child is seated in a child seat placed on the seat, an occupant determination may also be made on the basis of the detection results of the occupant detection sensor 41. In addition, the seatbelt control system 32 may determine the presence or absence of the occupant on the seat, or whether or not the seatbelt is fastened, on the basis of output of a buckle switch provided on a buckle of the seatbelt.

The airbag control system 31 and the other systems included in the protection system 30 perform the control based also on detection results of a bumper pressure sensor 42 or an acceleration sensor 43. These systems detect a crash or other phenomenon on the basis of a high degree of acceleration caused by a sudden deceleration due to the crash or a harsh braking, or on the basis of pressure applied to a bumper of the own vehicle in the crash, and then provide the control according to the phenomenon. Multiple bumper pressure sensors 42 or the acceleration sensors 43 may be mounted on the vehicle. For example, the acceleration sensors 43 may be installed on a door or a pillar of the vehicle, or in a center of the vehicle. Each of the detection results obtained from the plural acceleration sensors 43 may be used independently, or some of the results are comprehensively used. The detection results may also be used in combination with detection result of other sensor or a radar.

The pre-crash control system 20 predicts, that is, determines the possibility of the crash or other phenomenon before it actually occurs and, on the basis of the prediction, the pre-crash control system 20 causes the protection system 30 or other systems to operate. The prediction is made on the basis of other vehicles or other objects around the own vehicle 80 which is detected by a millimeter wave radar 21 or other means. In addition, the pre-crash control system 20 may alarm the driver with a warning message or warning sound via a speaker 9c of the monitoring device 9 or a buzzer. In addition, the pre-crash control system 20 may operate in cooperation with the power steering system 52 or the seat control system 33 to alarm the driver by causing the steering wheel or the seat 90 to vibrate.

Figure 5A:
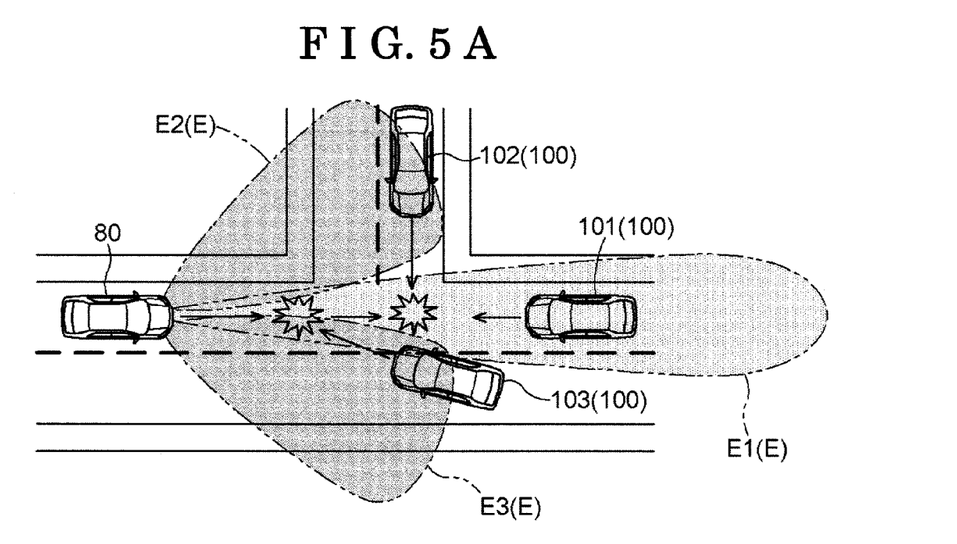
FIG. 5A illustrates an example of a detection range for another vehicle or an object in surroundings of the own vehicle.
Figure 5B:
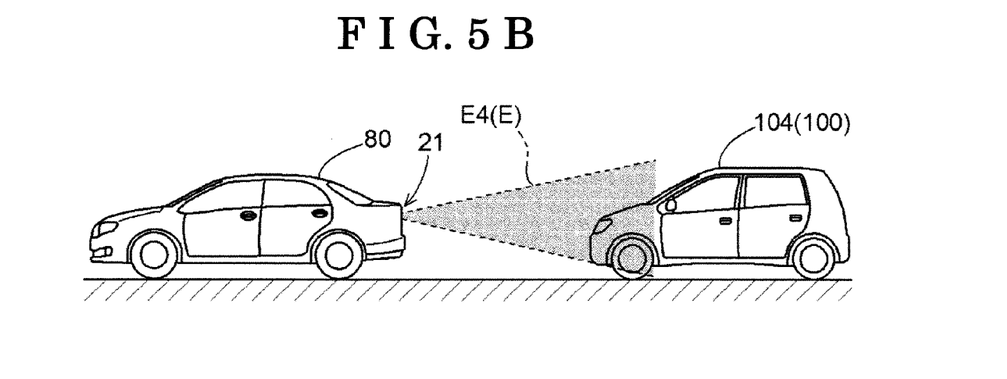
FIG. 5B illustrates an example of a detection range for another vehicle or an object in surroundings of the own vehicle.

In this embodiment, the plural millimeter wave radars 21 are installed on the vehicle (own vehicle) 80. For example, as shown in FIG. 5, the three millimeter wave radars 21 are installed on a front portion of the own vehicle 80. Detection range E covered by the millimeter wave radars 21 includes a forward direction detection range E1, a diagonally forward left direction detection range E2 and a diagonally forward right direction detection range E3 when viewed from the own vehicle 80. Thus, not only another vehicle 102 (100) that might have a front crash but also another vehicle 102 (100) that might have a side crash and another vehicle 103 (100) that might have an offset crash with the own vehicle 80 are detected well. In addition, the millimeter wave radar 21 (rearward looking radar) whose detection range corresponds to a rearward direction detection range E4 is installed on a rear portion of the own vehicle 80. Thus, another vehicle 104 (100) that might have a rear-end crash with the own vehicle 80 is detected well. A detectable distance and a detectable angle of the millimeter wave radar 21 are, for example, set to 30 to 50 meters and 30 to 40 degrees, respectively.

For example, when the pre-crash control system 20 predicts the possibility of the crash ahead of the own vehicle 80, it performs the brake assist for increasing the brake force by means of the brake system 51. This decreases speed at which the own vehicle 80 approaches the another vehicle or object that might cause the crash ahead, thereby reducing a likelihood of the crash or allowing time for the driver to prevent the crash. The pre-crash control system 20 may also cause engine speed to decrease by means of the engine control system 53 or cause downshifting by means of the transmission control system 54 to apply engine braking.

When the possibility of the crash is predicted to be extremely high and the crash is determined to be unavoidable, the pre-crash control system 20 may issue an actuation command to the seat control system 33 and/or to the seatbelt control system 32 for moving the seat 90 and/or actuating the seatbelt tensioner, respectively. Alternatively, the pre-crash control system 20 may cause the emergency braking to be applied via the brake system 51 when the crash is determined to be unavoidable. The pre-crash control system 20 may, immediately before the side crash, start to cause the side airbag, the curtain airbag or the rear-seat center airbag to operate. Detection time of the acceleration sensor 43 installed in the center of the vehicle is set to longer than that of the acceleration sensors 43 installed on the door or the pillar. By using the millimeter wave radar 21, the airbag are deployed at an earlier timing upon detection of the unavoidable crash.

For example, when the pre-crash control system 20 predicts the possibility of the rear-end crash, it causes the seat control system 33 to be prepared for an adjustment of position of the headrest 91 or a repositioning of the seatback 92. The pre-crash control system 20 may issue, depending on a degree of the crash possibility, the actuation command to the seat control system 33 for adjusting the position of the headrest 91 or repositioning the seatback 92. When the pre-crash control system 20 predicts that there is the possibility of the frontal crash or the rear-end crash, it may output a warning via the speaker 9c of the monitoring device 9, or other sound generating devices. This may allow the driver to voluntarily slow down or change lanes, thereby possibly avoiding the crash.

The pre-crash control preparation system 10 and the pre-crash control system 20 may be configured on a single hardware, and each function of the pre-crash control preparation system 10 and the pre-crash control system 20 may be performed by executing an individual program prepared for each system. As shown in FIG. 2, the pre-crash control preparation system 10 and the pre-crash control system 20 constitute a pre-crash ECU (electronic control unit) 1. The pre-crash ECU 1 also includes a CPU (central processing unit) 2 as a core unit of the ECU, a program memory 3, a work memory 4, a radar IF (radar interface) circuit 5, and peripheral circuits. The CPU 2 performs an arithmetic processing by using a program and a parameter stored in the program memory 3. The CPU 2 also temporarily stores data or other information in the work memory 4 as needed and performs the arithmetic processing. In FIG. 2, the program memory 3 and the work memory 4 are shown separately from the CPU 2 but these memories may be integrated together in one package with the CPU 2. In this embodiment, the CPU 2 is the core unit of the pre-crash ECU 1 but other logic operation processor or logic circuit such as a DSP (digital signal processor) may be the core unit of the pre-crash ECU 1. The radar IF is an interface circuit that adjusts sensitivity, directivity and other characteristics of the millimeter wave radar 21, and receives detection result from the millimeter radar 21.

Figure 6:
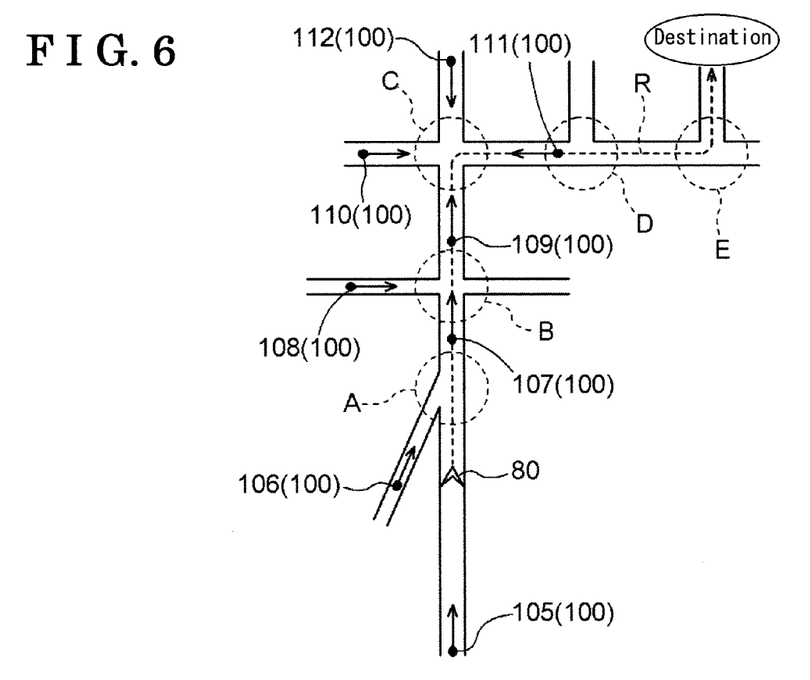
FIG. 6 illustrates an example of a preparation processing of a pre-crash control.

Examples of occupant protection control will be explained below. First, an example of control performed by the pre-crash control preparation system 10 will be explained. Processing performed by the pre-crash control preparation system 10 is executed in the pre-crash ECU 1 that includes the CPU 2 therein as the core unit. FIG. 6 shows a positional relationship between the own vehicle 80 and the another vehicle 100 on the map at a certain point of time, which is established on the basis of the own-vehicle information and the other-vehicle information.

The pre-crash ECU 1 (the own-vehicle information acquisition unit 11) obtains map information and positional information of the own vehicle 80 from the navigation system 8. In FIG. 6, the arrowhead indicates the own vehicle 80 moving in a direction of the arrow. The occupant sets the destination on the navigation system 8. The navigation system 8 calculates the course to the destination set by the occupant on the basis of road attribution information stored in a database, road condition, calculation condition and the like. The road attribution information includes types of roads such as general road or highway, and the number of traffic lanes. The road condition includes information on traffic jam or road construction and is obtained, for example, from optical beacon or via FM radio broadcast. The calculation condition reflects time and toll fare that are set by the occupant or a user. The calculated course is sent from the navigation system 8 to the pre-crash control preparation system 10 as the route information R. In FIG. 6, a dashed line R drawn from the own vehicle 80 to the destination along the road indicates the route information R calculated and set by the navigation system 8.

In FIG. 6, each of the black circles 105 to 112 indicates the another vehicle 100, the arrows extending from the black circles 105 to 112 indicate directions of movement. That is, each of the other vehicles 105 to 112 shown in FIG. 6 represents the another vehicle 100 that establishes the vehicle-to-vehicle communication with the own vehicle 80. The vehicle-to-vehicle communication system 7 performs the vehicle-to-vehicle communication with the another vehicle 100, and receives the other-vehicle information that includes at least the position information and the identification information (ID information) of the another vehicle 100. By continuously establishing the vehicle-to-vehicle communication, a moving direction and speed of the another vehicle 100 may be calculated from changes in the position information of the another vehicle 100, however, it is ideal if the moving direction and the speed of the another vehicle 100 is obtained through the vehicle-to-vehicle communication. The pre-crash ECU 1 (the other-vehicle information acquisition unit 12) acquires such information from the vehicle-to-vehicle communication system 7. In case the another vehicle 100 is provided with a navigation system, the other-vehicle information acquisition unit 12 may acquire a destination of the another vehicle 100 and the related route information as the other-vehicle information via the vehicle-to-vehicle communication.

As explained above, the positional relationship between the own vehicle 80 and the another vehicle 100 is defined on the map of the navigation system 8 on the basis of the map information, the positional information of the own vehicle 80 and the another vehicle 100, the route and the position information of the another vehicle 100. This positional relationship between the own vehicle 80 and the another vehicle 100 does not have to be in a form of image, and may be, for example, stored in the work memory 4 as data. FIG. 6 shows intersections A, B, C, D, E on the route R, i.e., the dashed line R. For example, the crash condition at each intersection is calculated in order of arrival of the own vehicle 80. Here, the crash condition includes the possibility of occurrence of the crash between the own vehicle 80 and the another vehicle 100, time of the crash, and the type of the crash. For explanatory convenience, the crash occurring at the intersection is referred to in this embodiment, however, the crash condition may also be calculated in terms of the rear-end crash by a following vehicle, or the crash with an oncoming vehicle drifting over the center line and so forth.

Figure 7:
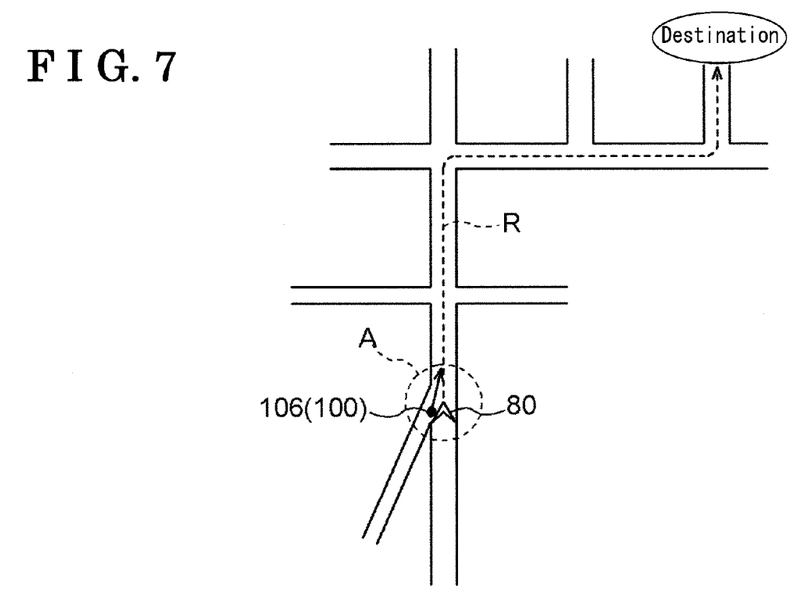
FIG. 7 illustrates an example of the preparation processing of the pre-crash control.

FIG. 7 schematically shows a calculation result of the possibility of the crash at the intersection A. In this example, the another vehicle 106 is about to merge into a main lane without decreasing its speed. It is calculated that there is the possibility that the own vehicle 80 moving straight on the main lane and the another vehicle 106 arrive at an approximately same point on the route R at approximately the same time. In case the another vehicle 106 and the own vehicle 80 arrive at the intersection A at the approximately same time, there is the possibility that the another vehicle 106 crashes into a side of the own vehicle 80 (pattern a). In case the another vehicle 106 arrives at the intersection A slightly earlier than the own vehicle 80, there is the possibility that the own vehicle 80 collides with the another vehicle 106 (pattern b). On the contrary, in case that the own vehicle 80 arrives at the intersection A earlier, there is the possibility that the own vehicle 80 is rear-ended by the another vehicle 106 (pattern c).

As explained above, the crash conditions (patterns) a, b and c are conceivable. To respond to the crash conditions and avoid the crash, it is ideal that behavior of the another vehicle 106 is detected early. The operation preparation unit 14 of the pre-crash control preparation system 10 instructs the pre-crash control system 20 to perform enhanced monitoring of the diagonally forward left direction of the own vehicle 80. The pre-crash control system 20, upon receiving the instruction, issues a radar sensitivity adjustment command #1 so that the sensitivity of the millimeter wave radar 21, whose detection range is the diagonally forward left direction detection range E2, is increased or so that the detection result is more frequently obtained from the millimeter wave radar 21 (refer to FIG. 2). In accordance with the radar sensitivity adjustment command #1, the detection result of the detection in the diagonally forward left direction detection range E2 is more frequently acquired than those of the other detection ranges to enhance monitoring of the detection range E2. Specifically, the detection results are acquired in the following sequence; "the diagonally left forward direction, the forward direction, the diagonally left forward direction, the diagonally right forward direction, the diagonally left forward direction" instead of the usual sequence; "the diagonally left forward direction, the forward direction, the diagonally right direction, the diagonally left direction"

The operation preparation unit 14 may issue a preparation command to the brake system 51 so that the brake system 51 is prepared for providing the brake assist to help the driver with the avoidance maneuver. The preparation command may be sent to the brake system 51 via the pre-crash control system 20. Whether the preparation command is sent to the brake system 51 directly or via the pre-crash control system 20 does not pose any problem in case that the pre-crash control preparation system 10 and the pre-crash control system 20 are configured on the same hardware as explained in this embodiment. When several patterns are conceivable as in the positional relationship shown in FIG. 6, the possibility (probability) that each pattern occurs may be calculated, and the preparation commands may be issued according to the order of the calculated probabilities.

In preparation for when the crash actually occurs, an airbag preparation command #32, a seatbelt tensioner preparation command #34 and a seatback reposition preparation command #36 are issued by the pre-crash control system 20 to cause the airbag, the seatbelt tensioner and the seatback 92 to be ready to operate or move. In response to these commands, the preparations are performed, that is, the related actuator is turned on so that the actuator is ready to operate without delay upon reception of an operation command issued by the pre-crash control system 20, or so that a mechanical clearance is reduced for moving or repositioning the airbag, the seatbelt tensioner or the seatback 92 to each targeted position in the minimum time upon reception of the operation command. This enables the actuators to complete the operation at a possible highest speed when the crash actually occurs.

Figure 8:
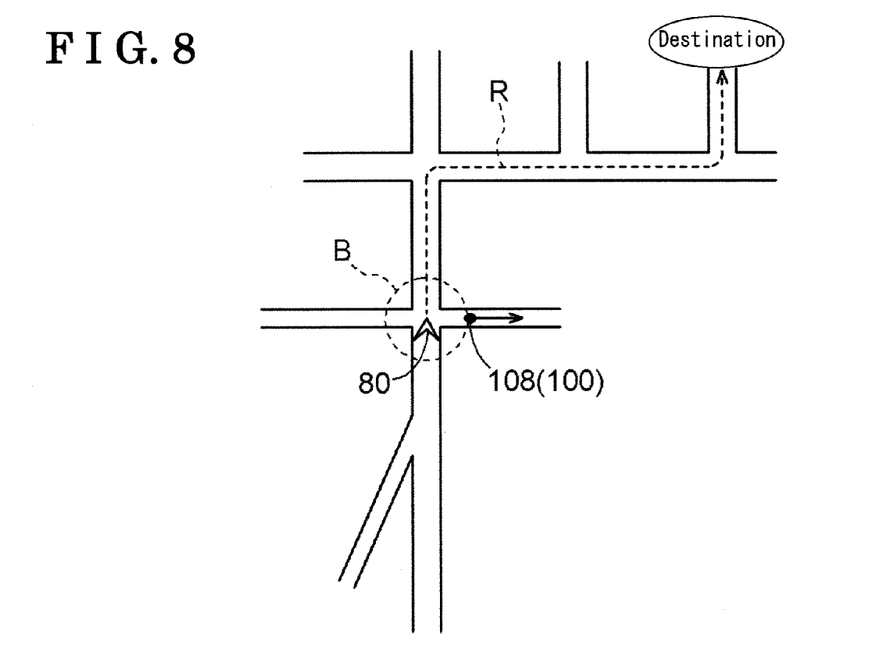
FIG. 8 illustrates an example of the preparation processing of the pre-crash control.

FIG. 8 schematically shows a calculation result of the possibility of the crash at the intersection B. In case that the another vehicle 108 runs at a normal speed, it is supposed to pass through the intersection B by the time the own vehicle 80 reaches the intersection B. In case that the another vehicle 108 decreases its speed, however, there is the possibility of the crash between the another vehicle 108 and the own vehicle 80. For example, in case no traffic lights are provided at the intersection B and the another vehicle 108 decreases its speed to pass through the intersection, there is the possibility that the own vehicle 80 collides with the another vehicle 108. Therefore, the operation preparation unit 14 instructs the pre-crash control system 20 to perform the enhanced monitoring of the diagonally forward left direction and the forward direction of the own vehicle 80. The pre-crash control system 20, upon receipt of the instruction, issues the radar sensitivity adjustment command #1 so that the sensitivity of the millimeter wave radars 21, whose detection ranges are the forward direction detection range E1 and the diagonally forward left direction detection range E2, is increased or so that the detection results are more frequently obtained from the millimeter wave radars 21.

Figure 9:
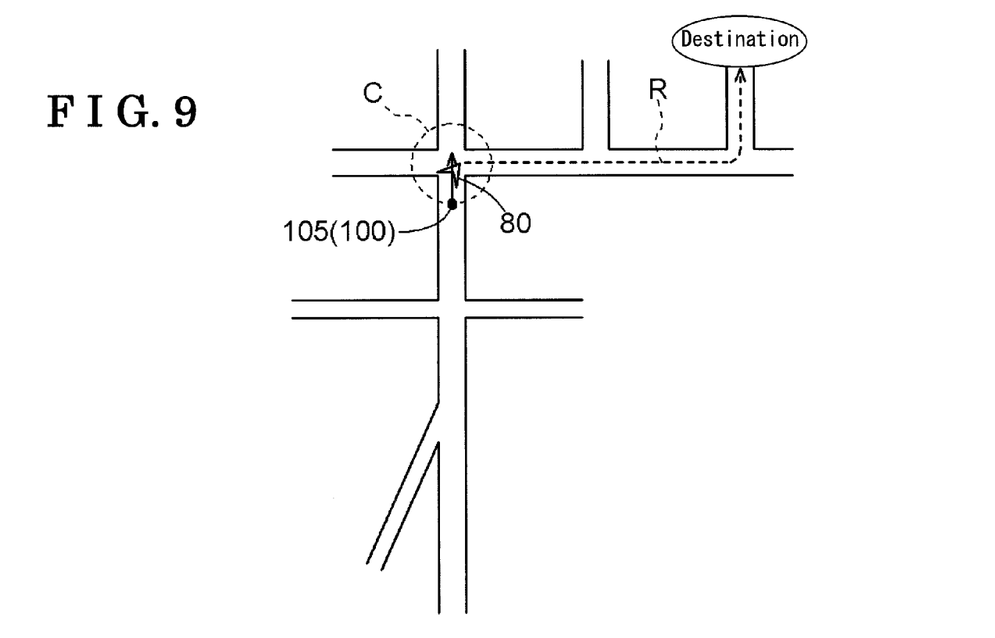
FIG. 9 illustrates an example of the preparation processing of the pre-crash control.

FIG. 9 schematically shows a calculation result of the possibility of the crash at the intersection C. Because the own vehicle 80 is going to turn right at the intersection C, it possibly decreases its speed, or temporarily stops in case that there is an oncoming vehicle. FIG. 6 shows that the another vehicle 105 is some distance behind the own vehicle 80. In case that the another vehicle 105 catches up with the own vehicle 80 at the intersection C, there is the possibility that the own vehicle 80 is rear-ended by the another vehicle 105. Therefore, the operation preparation unit 14 instructs the pre-crash control system 20 to perform the enhanced monitoring of the rearward direction of the own vehicle 80. The pre-crash control system 20, upon receiving the instruction, issues the radar sensitivity adjustment command #1 so that the sensitivity of the millimeter wave radar 21, whose detection range is the rearward direction detection range E4, is increased or so that the detection result is more frequently obtained from the millimeter wave radar 21. In preparation for when the ear-end crash actually occurs, a headrest reposition preparation command #38 is issued to cause the headrest 91 to be ready to move. In response to this command, the preparation is performed, that is, the related actuator is turned on so that the actuator is ready to operate without delay upon reception of the operation command, or so that the mechanical clearance is reduced for moving the headrest 91 to the targeted position in the minimum time.

In this example, the crash condition where the own vehicle 80 is rear-ended while it is temporarily stopped is provided, however, another condition is possible where the another vehicle 105 approaches the own vehicle 80 at an extremely high speed or a distance between the own vehicle 80 and the another vehicle 105 is decreased when the own vehicle 80 decreases its speed due to the traffic jam or other reason. The crash conditions, which include the rear-end crash and the other types of the crash explained above, are not limited to the examples explained in this embodiment. In addition, a direction from which or speed at which the another vehicle 100 approaches the own vehicle 80 are also considered when the crash condition is calculated. Also, a deployment speed of the airbag, a timing for moving or repositioning each portion of the sheet 90 with the current position of each position considered, and other factors may be taken into account.

Figure 10:
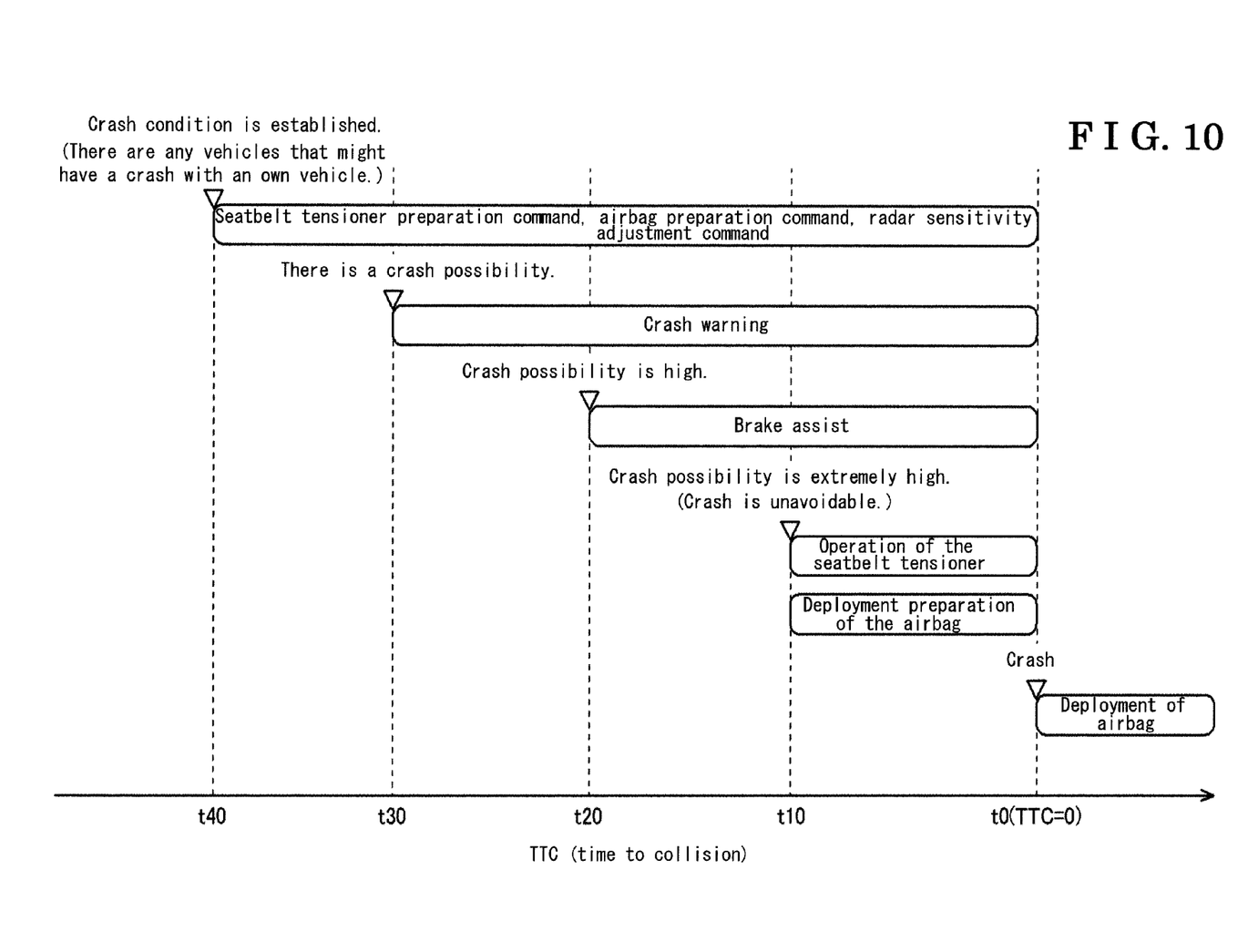
FIG. 10 shows an example of a flow of the pre-crash control.

As explained above, the operation preparation unit 14 makes the preparations for the crash. FIG. 10 shows a flow of the control performed by the occupant protection system. In FIG. 10, a horizontal axis refers to a time to collision (TTC). That is, a time before the crash is defined relative to a time of collision t0. For example, a time t10 refers to a "time when the possibility of the crash is extremely high" and a "time when the crash is unavoidable". The time t10 corresponds, for example, to 0.5 to 1 seconds before the crash. A time t20 precedes the time t10 and refers to a "time when the possibility of the crash is high" where the crash is possibly avoidable. The time t20 corresponds, for example, to 1 to 1.5 seconds before the crash. A time t30 precedes the time t20 and refers to a "time when there is the possibility of the crash". At the time t30, the crash is avoidable by the maneuver of the vehicle by the driver. The time t30 corresponds, for example, to 2 to 3 seconds before the crash. A time t40 precedes the time t30 and refers to a "time when it is determined that there are any vehicles that might have a crash with the own vehicle 80", in other words, a "time when it is determined that the crash condition is established". The time t40 corresponds, for example, to 3 to 5 seconds before the crash.

Here, the time t10, the time t20, the time t30, and the time t40 are defined as a first time to collision t10, a second time to collision t20, a third time to collision t30 and a fourth time to collision t40, respectively. The occupant protection system includes the pre-crash control preparation system 10, the pre-crash control system 20 and the protection system 30, and these three systems include plural systems. Some of these plural systems play core roles at each of the above-explained times. A first system, a second system, a third system and a fourth system play the core roles at the time t10, the time t20, the time t30, and the time t40, respectively. The pre-crash control system 20 and the protection system 30, each of which serves as the crash damage decreasing system 40, include the first system, the second system, the third system and the fourth system.

The final operation system operates after the time of collision t0, that is, after the crash occurs. For example, the airbag control system 31 that controls the SRS airbag for the driver's seat or the front passenger's seat corresponds to the final operation system. FIG. 10 shows "deployment of the airbag" as an example of the operation of the final operation system.

The first system operates at the first time-to-collision t10, which precedes the occurrence of the crash and when the crash is determined to be unavoidable. For example, the airbag control system 31 that controls the side airbag, the curtain airbag, the rear-seat center airbag or other airbags corresponds to the first system. The seatbelt control system 32 for controlling the seatbelt tensioner, the seat control system 33 for controlling the headrest 91 and other portions of the seat 90, and the brake system 51 for providing the emergency braking also correspond to the first system. The airbag control system 31 performs the preparation for deployment of the airbag and corresponds to the first system. Meanwhile, the airbag control system 31 also corresponds to the final operation system in that it controls the SRS airbag for the driver's seat or the front passenger's seat. The pre-crash control system 20 that issues the airbag preparation command #32 in terms of the driver's seat and the front passenger's seat on the basis of the detection result of the millimeter wave radar 21 as shown in FIG. 2, an airbag deployment preparation command #31 related to the side airbag and other airbag, a seatbelt tensioner operation command #33, and a headrest reposition command #37 also correspond to the first system. FIG. 10 shows "operation of the seatbelt tensioner" and "deployment preparation of the airbag" as examples of operation of the final operation system.

The second system operates at the second time-to-collision t20, which precedes the first time to collision t10 and when the possibility of the crash is high. For example, the brake system 51 that performs the brake assist by increasing the hydraulic pressure of the brake mechanism, and the seat control system 33 that controls the seatback 92 and other portions of the seat 90 correspond to the second system. Some of the systems that function as the final operation system or the first system also correspond to the second system. They are the airbag control system 31 for preparing the deployment of the airbags, the seat control system 33 for preparing the operations of the headrest 91 and other portions of the seat 90, and the brake system 51 for preparing the emergency braking by actuating a pump to increase the hydraulic pressure. The pre-crash control system 20 that issues the airbag preparation command #32, the seatbelt tensioner preparation command #34, the headrest reposition preparation command #38, a seatback reposition command #35 on the basis of the detection result of the millimeter wave radar 21 as shown in FIG. 2 also corresponds to the second system. FIG. 10 shows "brake assist" as an example of the operation of the second system.

The third system operates at the third time-to-collision t30, which precedes the second time to collision t20 and when it is determined that there is the possibility of the crash. For example, the pre-crash control system 20 that outputs the warning via the speaker 9c of the monitoring device 9 or other sound generating device, the power steering system 52 that alarms the driver by causing the steering wheel or the seat 90 to vibrate, and the seat control system 33 correspond to the third system. The pre-crash control system 20 that issues the seatback reposition preparation command #36 on the basis of the detection result of the millimeter wave radar 21 as shown in FIG. 2 also correspond to the third system. FIG. 10 shows "crash warning" as an example of the operation of the third system.

The fourth system prepares, before the third time to collision t30 (for example, at the fourth time to collision t40), the crash damage decreasing system 40 to operate. The pre-crash control preparation system 10, specifically the operation preparation unit 14, corresponds to the fourth system. The pre-crash control preparation system 10 issues, via the pre-crash control system 20, the radar sensitivity adjustment command #1 for adjusting the sensitivity of the millimeter wave radar 21, and a sensor sensitivity adjustment command #2 for adjusting the sensitivity of the sensors including the acceleration sensor 43. The pre-crash control preparation system 10 may also issue, via the pre-crash control system 20, the airbag preparation command #32, the seatbelt tensioner preparation command #34, the seatback reposition preparation command #36 and the headrest reposition preparation command #38. FIG. 10 shows "seatbelt tensioner preparation command", "airbag preparation command" and "radar sensitivity adjustment command" as examples of operation of the fourth system.

As explained above, the pre-crash safety system according to the embodiment includes the pre-crash control preparation system 10, and thus the appropriate measures are taken at the even earlier timing than the conventional pre-crash to post-crash timing. According to the embodiment, the crash is detected in advance with higher accuracy by evaluating the condition for the crash to occur (including the possibility of the crash) at the earlier timing in details. On the basis of the crash condition calculated from the own-vehicle information and the other-vehicle information, it is possible to cause the crash damage decreasing system 40 to operate for issuing the warning or moving appropriate portions of the seat 90 before the third time to collision t30. However, as early as before the third time to collision t30, it is considered that the calculated crash condition often spontaneously disappears due to the vehicle maneuver by the driver. In such a case, the crash damage decreasing system 40 causes, for example, the seat 90, the seatbelt, the warning to move or operate in vain, which may cause frustration to the driver and the occupants of the own vehicle.

For example, in case that the warning is outputted only on the basis of the crash condition that is calculated from the other-vehicle information acquired from the vehicle-to-vehicle communication, the road-to-vehicle communication, the vehicle-to-infrastructure-to-vehicle communication or the like, the driver is alarmed of the crash with the another vehicle that is still outside vision ranges of the radar or the camera. Such a case may possibly occur, considering that the range of the vehicle-to-vehicle communication is approximately 90 meters in the urban area, and the detectable distance of the millimeter wave radar 21 is approximately 30 to 50 meters as stated above. It is also possible that the driver does not trust the warning because the another vehicle 100 is not even within the visual field at this time. According to the embodiment, however, the crash damage decreasing system 40 is prepared to operate on the basis of the crash condition calculated from the own-vehicle information and the other-vehicle information but the crash damage decreasing system 40 does not actually operate, which alleviates the above-mentioned driver frustration. In addition, the crash condition is calculated not only from the other-vehicle information and the positional information of the own vehicle 80 but also the course that the own vehicle 80 is to take is considered, by using the route information R. Consequently, the crash condition is calculated with higher accuracy and the crash damage decreasing system 40 does not operate in vain.

As explained above, the occupant protection system according to the embodiment grasps the crash condition and the crash possibility at the early timing, and promptly operates when the crash actually occurs, while minimizing excessive preparatory operation.

Due to the above-described structure, the crash damage decreasing system 40, which decreases the level of the crash damage that the occupant of the own vehicle 80 may suffer at the time of the crash, is prepared for the crash at the early timing. By calculating the crash condition between the own vehicle 80 and the another vehicle 100, the crash is detected in advance with improved accuracy. The crash condition is calculated from the route information R that is the information about the course that the own vehicle 80 takes to get to its destination, and the positional information of the another vehicle 100 that is acquired via the vehicle-to-vehicle communication. Accordingly, the crash condition is calculated, focusing on the other vehicles that might be relevant to the route that the own vehicle 80 is going to take. In addition, a way how the another vehicle might be involved in the route of the own vehicle 80 is grasped in advance, and thus the crash condition is calculated with improved accuracy. This also decreases a possibility that the crash damage decreasing system 40 operates needlessly due to excessive caution. Consequently, the above-described structure provides the occupant protection system for vehicle that identifies the crash condition and the possibility of the crash at the early timing, and promptly operates when the crash actually occurs, while minimizing the excessive preparatory operation.

According to the disclosure, the crash condition includes the possibility for the crash condition to be established and the type of the possible crash.

The crash damage decreasing system 40 is not a monolithic system, but it typically includes the plural systems each of which responds to the different types of the crash such as the frontal crash, the side crash, the rear-end crash, and the offset crash. Therefore, the appropriate system, among the plural systems included in the crash damage decreasing system 40, which can decrease the level of the crash damage that the occupant of the own vehicle 80 may suffer under the calculated crash condition is prepared for the operation because the crash condition is calculated to include the types of the crash. When plural types of the crash are predicted at the same time, priority is determined depending on the possibility for the crash condition to be established for each type of the crash.

According to the disclosure, the crash damage decreasing system 40 includes the pre-crash control system 20 detecting the another vehicle 100 and determining the possibility of the crash, and the protection system 30 for protecting the body of the occupant against the crash that actually occurs. The operation preparation unit 14 causes the pre-crash control system 20 to adjust the sensitivity of detecting the another vehicle 100.

The pre-crash control system 20 determines the possibility of the crash, therefore, the accuracy of the determination on the possibility of the crash becomes higher, and the timing when the determination is made becomes earlier by adjusting the sensitivity of the pre-crash control system 20 to detect the another vehicle 100. As a result, a longer period of time is provided before operating the protection system 30 or other systems to decrease the level of the crash damage that the occupant of the own vehicle 80 may suffer in the crash, which improves occupant protection effects.

According to the disclosure, the crash damage decreasing system 40 includes a pre-crash control system 20 detecting the another vehicle 100 and determining a possibility of the crash, and a protection system 30 for protecting a body of the occupant against the crash that actually occurs. The operation preparation unit 14 causes the protection system 30 to go into a state in which the protection system 30 completes protecting the body of the occupant at a possible highest speed when the crash occurs.

Consequently, the protection system 30 functions (that is, operates) immediately when the crash actually occurs, thereby decreasing the level of the crash damage that the occupant may suffer in the crash.

According to the disclosure, the crash damage decreasing system 40 includes a final operation system being operated after the crash occurs, a first system being operated at a first time to collision t10 which precedes the crash and when the crash is determined to be unavoidable, a second system being operated at a second time to collision t20 which precedes the first time to collision t10 and when the possibility of the crash is determined to be high, and a third system being operated at the third time to collision t30 which precedes the second time to collision t20 and when the crash is determined to be possible. The crash damage decreasing system 40 also includes the operation preparation unit 14 that functions as a fourth system and that prepares, prior to the third time to collision t30, the crash damage decreasing system 40 to operate.

Consequently, the crash condition is calculated and the operation preparation unit 14 causes the crash damage decreasing system 40 to be prepared for the operation appropriate for the calculated crash condition prior to the third time to collision t30 when the crash is determined to be possible. Thus, the accuracy of the determination on the possibility of the crash is improved, and the timing of the determination, which would be otherwise made at the third time to collision t30, is advanced. In addition, the system that shall be operated or shall be prepared to be operated after the crash is determined to be possible is prepared prior to the third time to collision t30, and thus the level of the crash damage given to the occupant is decreased. That is, the occupant protection system for vehicle according to this embodiment identifies the condition in which the crash may occur and the possibility of the crash to occur at the early timing, and promptly operates when the crash actually occurs, while minimizing excessive preparatory operation.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An occupant protection system for vehicle, comprising:
an own-vehicle information acquisition unit acquiring an own-vehicle information that includes a route information on a course of an own vehicle to a destination;
an other-vehicle information acquisition unit acquiring other-vehicle information that is received through vehicle-to-vehicle communication between the own vehicle and another vehicle, and that includes position information of said another vehicle;
a crash condition calculation unit calculating a crash condition between the own vehicle and said another vehicle on the basis of the route information on a course of an own vehicle to a destination and the position information of the another vehicle;
a crash damage decreasing system decreasing a level of a crash damage of an occupant of the own vehicle and being adapted to decrease the level of the crash damage that corresponds to the crash condition calculated by the crash condition calculation unit;
an operation preparation unit preparing the crash damage decreasing system being ready to operate without delay upon reception of an operation command issued by the crash condition calculation unit, wherein
the crash damage decreasing system includes: a pre-crash control system detecting said another vehicle and determining a possibility of the crash; and a protection system for protecting a body of the occupant against the crash that actually occurs, and
the operation preparation unit causes the protection system to go into a state in which the protection system completes protecting the body of the occupant, by adjusting at least one of brakes, engine speed, a seat control system, a seatbelt control system, an airbag, and a headrest, at a possible highest speed when the crash occurs.

2. The occupant protection system for vehicle according to claim 1, wherein the crash condition includes a possibility for the crash condition to be established and a type of the possible crash.

3. The occupant protection system for vehicle according to claim 1, wherein
the crash damage decreasing system includes: a pre-crash control system detecting said another vehicle and determining a possibility of the crash; and a protection system for protecting a body of the occupant against the crash that actually occurs, and
the operation preparation unit causes the pre-crash control system to adjust a sensitivity of detecting said another vehicle.

4. The occupant protection system for vehicle according to claim 2, wherein
the crash damage decreasing system includes: a pre-crash control system detecting said another vehicle and determining a possibility of the crash; and a protection system for protecting a body of the occupant against the crash that actually occurs, and
the operation preparation unit causes the pre-crash control system to adjust a sensitivity of detecting said another vehicle.

5. The occupant protection system for vehicle according to claim 2, wherein
the crash damage decreasing system includes: the pre-crash control system detecting said another vehicle and determining a possibility of the crash; and the protection system for protecting the body of the occupant against the crash that actually occurs, and
the operation preparation unit causes the protection system to go into a state in which the protection system completes protecting the body of the occupant at a possible highest speed when the crash occurs.

6. The occupant protection system for vehicle according to claim 3, wherein
the crash damage decreasing system includes: the pre-crash control system detecting said another vehicle and determining the possibility of the crash; and the protection system for protecting the body of the occupant against the crash that actually occurs, and
the operation preparation unit causes the protection system to go into a state in which the protection system completes protecting the body of the occupant at a possible highest speed when the crash occurs.

7. The occupant protection system for vehicle according to claim 4, wherein
the crash damage decreasing system includes: the pre-crash control system detecting said another vehicle and determining the possibility of the crash; and the protection system for protecting the body of the occupant against the crash that actually occurs, and
the operation preparation unit causes the protection system to go into a state in which the protection system completes protecting the body of the occupant at a possible highest speed when the crash occurs.

8. The occupant protection system for vehicle according to claim 1, wherein
the crash damage decreasing system includes a final operation system being operated after the crash occurs, a first system being operated at a first time to collision which precedes the crash and when the crash is determined to be unavoidable, a second system being operated at a second time to collision which precedes the first time to collision and when a possibility of the crash is determined to be high, and a third system being operated at the third time to collision which precedes the second time to collision and when the crash is determined to be possible, and
the operation preparation unit functioning as a fourth system prepares, prior to the third time to collision, the crash damage decreasing system to operate.

9. The occupant protection system for vehicle according to claim 2, wherein
the crash damage decreasing system includes a final operation system being operated after the crash occurs, a first system being operated at a first time to collision which precedes the crash and when the crash is determined to be unavoidable, a second system being operated at a second time to collision which precedes the first time to collision and when a possibility of the crash is determined to be high, and a third system being operated at the third time to collision which precedes the second time to collision and when the crash is determined to be possible, and
the operation preparation unit functioning as a fourth system prepares, prior to the third time to collision, the crash damage decreasing system to operate.

10. The occupant protection system for vehicle according to claim 3, wherein
the crash damage decreasing system includes a final operation system being operated after the crash occurs, a first system being operated at a first time to collision which precedes the crash and when the crash is determined to be unavoidable, a second system being operated at a second time to collision which precedes the first time to collision and when the possibility of the crash is determined to be high, and a third system being operated at the third time to collision which precedes the second time to collision and when the crash is determined to be possible, and
the operation preparation unit functioning as a fourth system prepares, prior to the third time to collision, the crash damage decreasing system to operate.

11. The occupant protection system for vehicle according to claim 4, wherein
the crash damage decreasing system includes a final operation system being operated after the crash occurs, a first system being operated at a first time to collision which precedes the crash and when the crash is determined to be unavoidable, a second system being operated at a second time to collision which precedes the first time to collision and when the possibility of the crash is determined to be high, and a third system being operated at the third time to collision which precedes the second time to collision and when the crash is determined to be possible, and
the operation preparation unit functioning as a fourth system prepares, prior to the third time to collision, the crash damage decreasing system to operate.

12. The occupant protection system for vehicle according to claim 1, wherein
the crash damage decreasing system includes a final operation system being operated after the crash occurs, a first system being operated at a first time to collision which precedes the crash and when the crash is determined to be unavoidable, a second system being operated at a second time to collision which precedes the first time to collision and when the possibility of the crash is determined to be high, and a third system being operated at the third time to collision which precedes the second time to collision and when the crash is determined to be possible, and the operation preparation unit functioning as a fourth system prepares, prior to the third time to collision, the crash damage decreasing system to operate.

13. The occupant protection system for vehicle according to claim 5, wherein the crash damage decreasing system includes a final operation system being operated after the crash occurs, a first system being operated at a first time to collision which precedes the crash and when the crash is determined to be unavoidable, a second system being operated at a second time to collision which precedes the first time to collision and when the possibility of the crash is determined to be high, and a third system being operated at the third time to collision which precedes the second time to collision and when the crash is determined to be possible, and the operation preparation unit functioning as a fourth system prepares, prior to the third time to collision, the crash damage decreasing system to operate.

14. The occupant protection system for vehicle according to claim 6, wherein the crash damage decreasing system includes a final operation system being operated after the crash occurs, a first system being operated at a first time to collision which precedes the crash and when the crash is determined to be unavoidable, a second system being operated at a second time to collision which precedes the first time to collision and when the possibility of the crash is determined to be high, and a third system being operated at the third time to collision which precedes the second time to collision and when the crash is determined to be possible, and the operation preparation unit functioning as a fourth system prepares, prior to the third time to collision, the crash damage decreasing system to operate.

15. The occupant protection system for vehicle according to claim 7, wherein the crash damage decreasing system includes a final operation system being operated after the crash occurs, a first system being operated at a first time to collision which precedes the crash and when the crash is determined to be unavoidable, a second system being operated at a second time to collision which precedes the first time to collision and when the possibility of the crash is determined to be high, and a third system being operated at the third time to collision which precedes the second time to collision and when the crash is determined to be possible, and the operation preparation unit functioning as a fourth system prepares, prior to the third time to collision, the crash damage decreasing system to operate.

\* \* \* \* \*